(12) United States Patent
Malone et al.

(10) Patent No.: US 11,959,582 B2
(45) Date of Patent: Apr. 16, 2024

(54) ADJUSTABLE STAND FOR A COMPUTER PERIPHERAL DEVICE

(71) Applicant: Logitech Europe S.A., Lausanne (CH)

(72) Inventors: Matthew Malone, Los Angeles, CA (US); Gaurav Bradoo, El Cerrito, CA (US); Po-Yuan Chuang, Hsinchu county (TW); Thien-Greg Nguyen, San Ramon, CA (US); Emma Kelp-Stebbins, Portland, OR (US); Grace Hina Lee, Oakland, CA (US); Osagie Igbeare, Oakland, CA (US)

(73) Assignee: Logitech Europe S.A., Lausanne (CH)

(*) Notice: Subject to any disclaimer, the term of this patent is extended or adjusted under 35 U.S.C. 154(b) by 0 days.

(21) Appl. No.: 17/852,834

(22) Filed: Jun. 29, 2022

(65) Prior Publication Data
US 2024/0003481 A1    Jan. 4, 2024

(51) Int. Cl.
*F16M 11/04* (2006.01)
*F16M 11/12* (2006.01)
*G03B 17/56* (2021.01)

(52) U.S. Cl.
CPC ......... *F16M 11/045* (2013.01); *F16M 11/046* (2013.01); *F16M 11/128* (2013.01); *G03B 17/561* (2013.01); *F16M 2200/024* (2013.01); *F16M 2200/028* (2013.01); *F16M 2200/066* (2013.01)

(58) Field of Classification Search
CPC .. F16M 11/045; F16M 11/046; F16M 11/128; F16M 2200/024; F16M 2200/028; F16M 2200/066; F16M 13/022; F16M 11/10; F21V 21/26; F21V 21/14
USPC ......... 248/124.1; 362/413, 418–431
See application file for complete search history.

(56) References Cited

U.S. PATENT DOCUMENTS

| | | | | |
|---|---|---|---|---|
| 908,751 | A * | 1/1909 | Cooke | A47B 57/42 439/534 |
| 2,333,353 | A * | 11/1943 | Zanella | A47B 23/025 248/447.2 |
| 3,627,244 | A * | 12/1971 | Nicholas | A61J 9/0638 248/103 |
| 4,140,296 | A * | 2/1979 | Guzman Guillen | A47B 23/007 248/447.2 |
| 6,764,055 | B1 * | 7/2004 | Lee | A47B 23/00 248/125.1 |
| 2001/0023914 | A1 * | 9/2001 | Oddsen, Jr. | F16M 13/02 248/274.1 |
| 2002/0167806 | A1 * | 11/2002 | Thaxton | F16M 11/40 362/396 |
| 2014/0029248 | A1 * | 1/2014 | Dyson | F21V 21/20 362/244 |
| 2016/0312950 | A1 * | 10/2016 | Bowman | F16M 11/2092 |
| 2019/0056094 | A1 * | 2/2019 | Dyson | F21S 6/003 |
| 2019/0384143 | A1 * | 12/2019 | Lynch | G03B 17/53 |

* cited by examiner

*Primary Examiner* — Christopher Garft
(74) *Attorney, Agent, or Firm* — Kilpatrick Townsend & Stockton LLP

(57) ABSTRACT

An adjustable stand for an electronic device that is operable for stable movement in two directions with the use of a single hand of a user. An ergonomic design leverages a natural and intuitive movement of a user's hand to maintain an orientation of the electronic device throughout at least 180 degrees of movement.

15 Claims, 20 Drawing Sheets

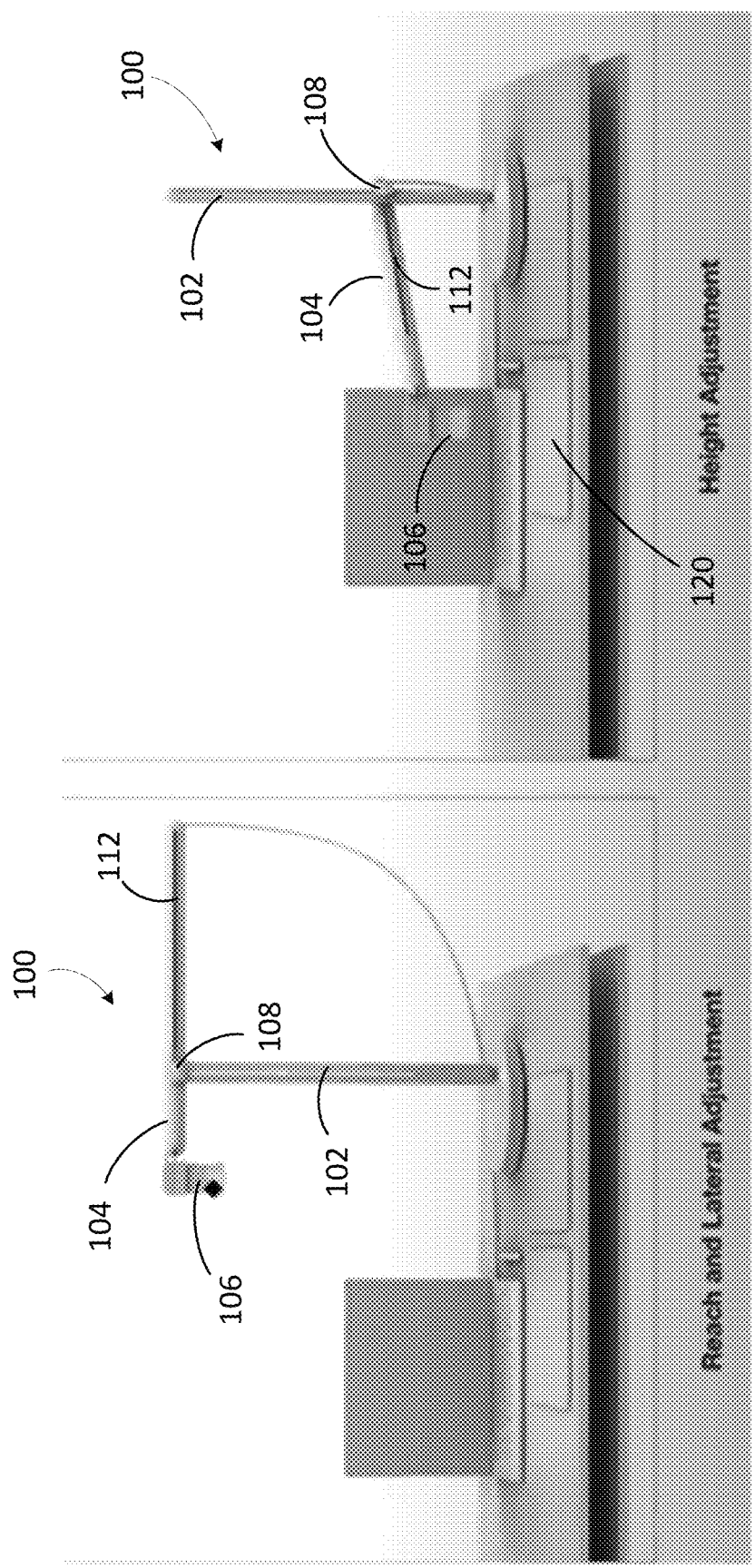

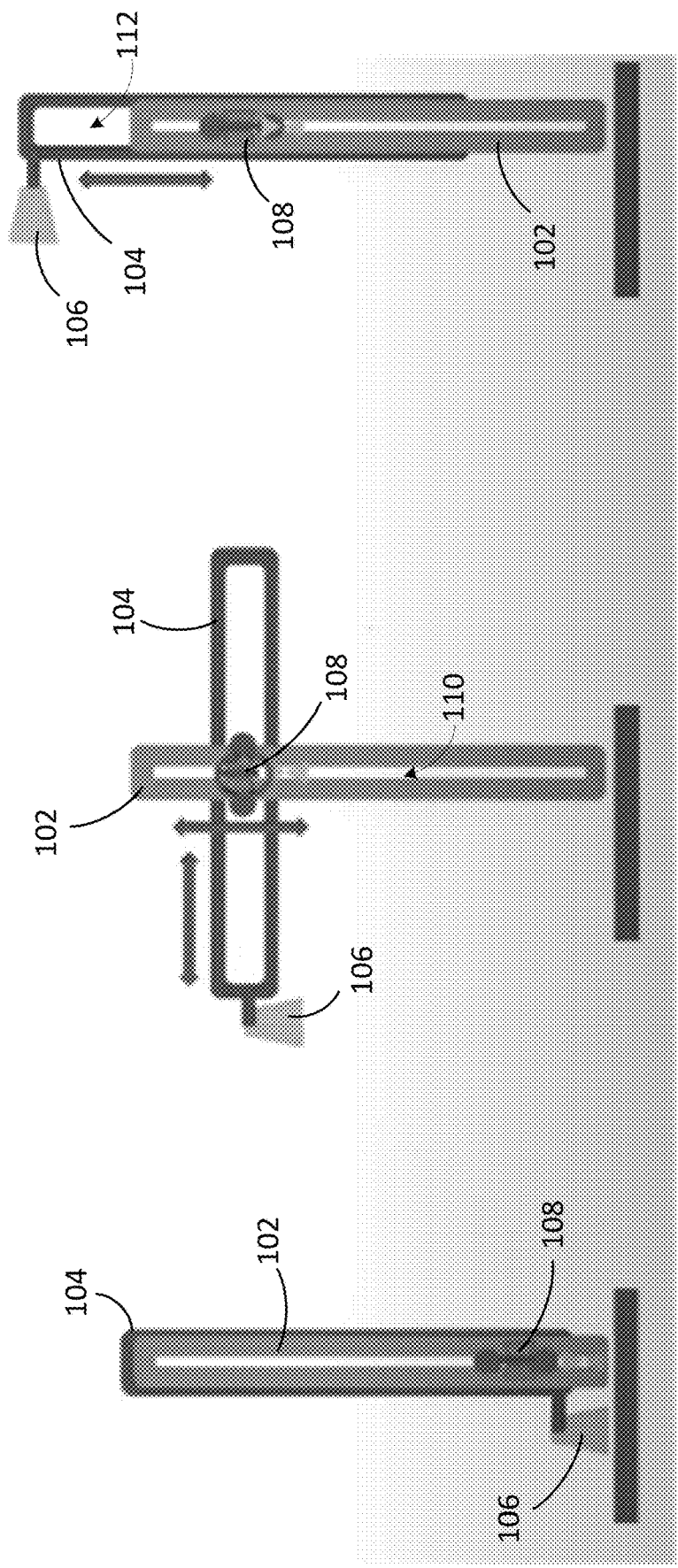

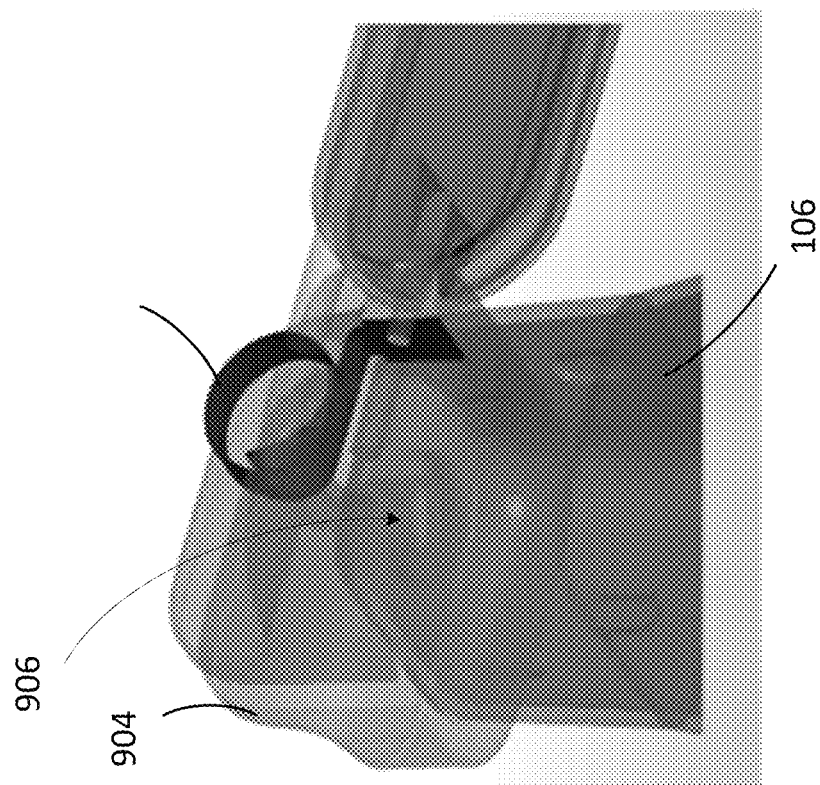
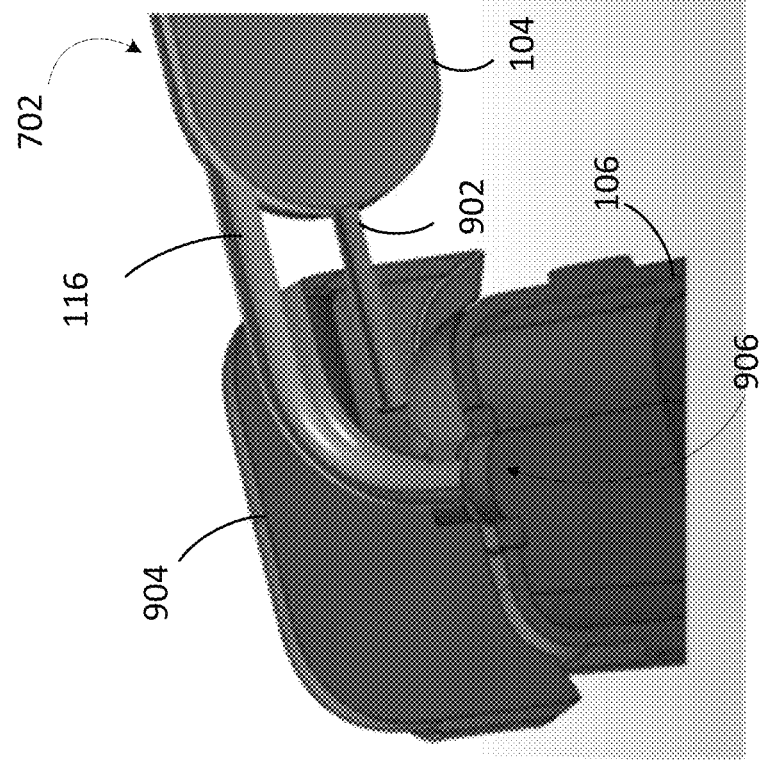
FIG. 9B
FIG. 9A

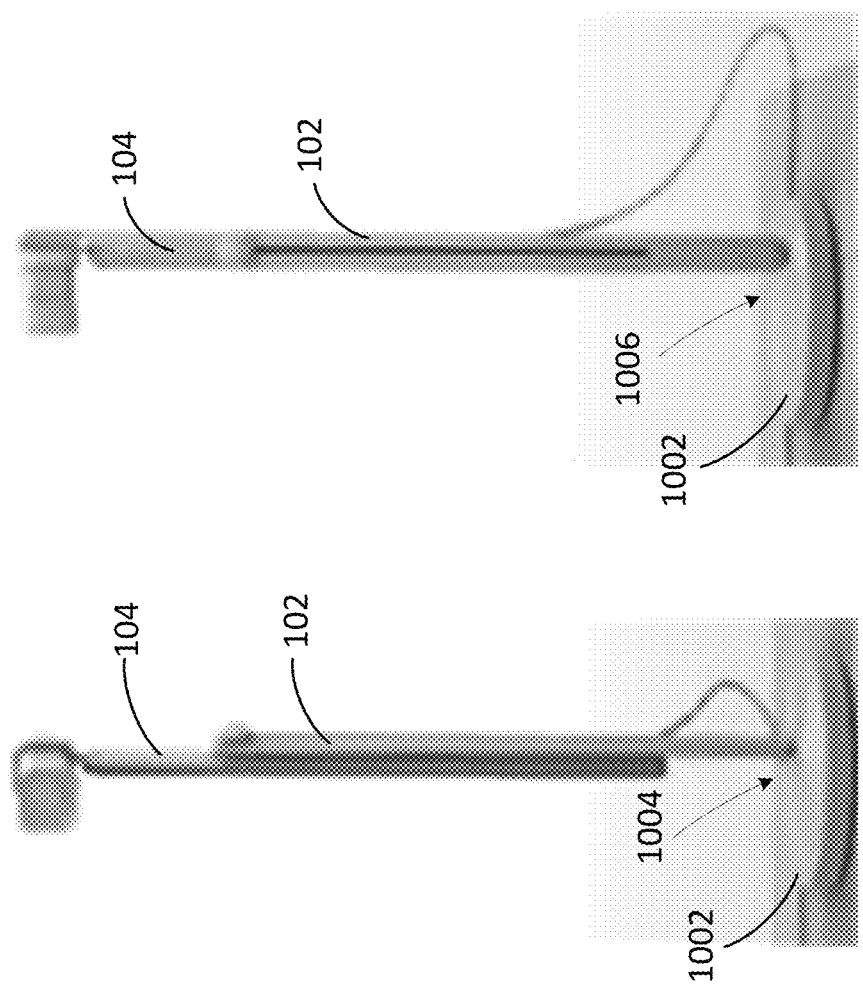

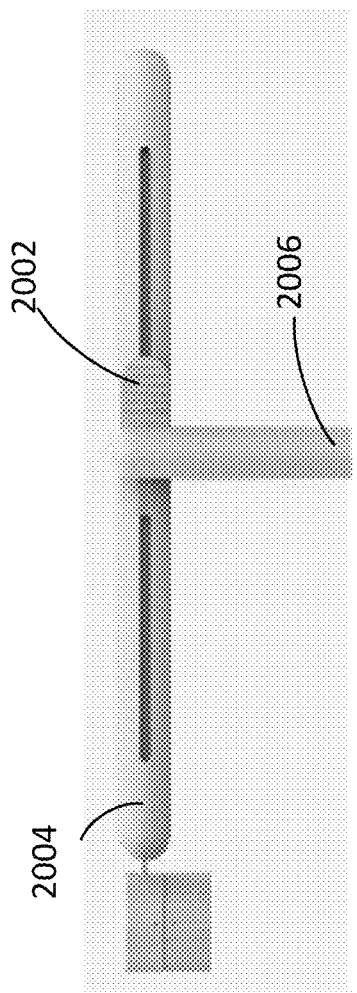
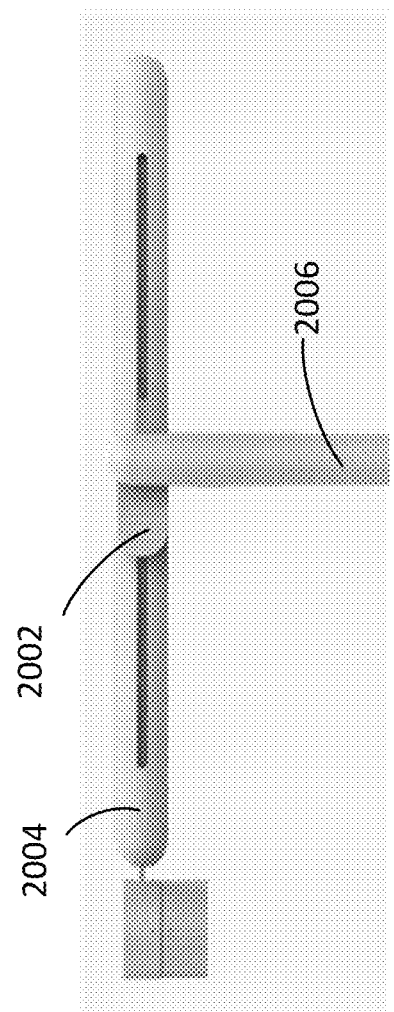

ADJUSTABLE STAND FOR A COMPUTER PERIPHERAL DEVICE

BACKGROUND OF THE INVENTION

Aspects of the present disclosure relate generally to adjustable stands for computer peripheral devices, such as cameras, according to certain embodiments.

Webcams are typically attached to the top of a computer display with a clamping mechanism. Users sometimes want to provide a view of a written document to the webcam. Users can hold the document up and try to move it within the field of view of the webcam. Alternately, users can remove the webcam from the clamping mechanism, or remove the webcam and clamping mechanism together, and point it downward and move it to over the document. It would be desirable to have a better mechanism for showing documents on a webcam.

Unless otherwise indicated herein, the materials described in this section of the Specification are not prior art to the claims in this application and are not admitted to be prior art by inclusion in this section.

BRIEF SUMMARY OF THE INVENTION

Embodiments provide an adjustable stand for an electronic device that is operable for stable movement in two directions with the use of a single hand of a user. An ergonomic design leverages a natural and intuitive movement of a user's hand to maintain an orientation of the electronic device as it moves to different 3-dimensional positions through the movement of a pole and arm.

In one embodiment, an adjustable stand for an electronic device is provided. The adjustable stand has a base with a pole extending vertically from the base. An arm extends from the pole, the arm being extendable horizontally and being vertically rotatable between a horizontal and vertical position. A clamping mechanism adjusts the height of the arm on the pole. An electronic device is attached to the arm, the electronic device being rotatable at least 180 degrees with respect to the arm.

In one embodiment, the electronic device is a camera. A mechanical zoom function, that is intuitive to a user, is achieved by the user simply grasping the camera and moving it and the arm vertically along the pole.

In one embodiment, the adjustable stand has a pole slot in the pole and an arm slot in the arm. A clamping mechanism extends through the arm slot and the pole slot, allowing movement of the arm horizontally and fixing a vertical position of the arm, but allowing vertical movement of the arm with respect to the pole when the clamping mechanism is released. A button is attached to the clamping mechanism. When the button is depressed, it releases a clamping force of the clamping mechanism on the pole, allowing the arm to slide vertically along the pole slot.

Embodiments provide a method that enables a user to move the camera in a horizontal plane to a desired horizontal position, causing an arm rotatably attached to the camera to rotate to follow the camera position. The arm also extends and retracts with respect to a supporting pole of the adjustable stand. The user can release a clutch mechanism and move the camera vertically to achieve a desired zoom field of view, causing the arm to move vertically along the pole.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 3 is a diagram of the adjustable stand of FIG. 1 illustrating horizontal movement according to certain embodiments;

FIG. 4 is a diagram of the adjustable stand of FIG. 1 illustrating vertical movement according to certain embodiments;

FIGS. 6A-C are diagrams illustrating horizontal and vertical movement of a stand, according to certain embodiments;

FIGS. 9A-B are diagrams of the attachment of the camera to the arm, according to certain embodiments;

FIGS. 10A-B are diagrams illustrating movement of the stand pole with a "Lazy Susan" base, according to certain embodiments;

FIGS. 19-20 are diagrams of an arm slide mechanism, according to certain embodiments.

DETAILED DESCRIPTION OF THE INVENTION

Aspects of the present disclosure relate generally to adjustable stands for computer peripheral devices, and in particular for cameras or webcams, according to certain embodiments.

In the following description, various examples of an adjustable stand for computer peripheral devices are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to help to prevent any obfuscation of the novel features described herein.

The following high-level summary is intended to provide a basic understanding of some of the novel innovations depicted in the figures and presented in the corresponding descriptions provided below. Aspects of the invention address the problem of a user trying to position a camera to alternately view the user or different documents on a user's desktop.

Aspects of the invention solve this problem by providing an adjustable stand for a camera or other electronic device that allows intuitive positioning by grasping the electronic device and moving it to the desired position, with a supporting arm of the adjustable stand moving with the electronic device.

Figure 1B:
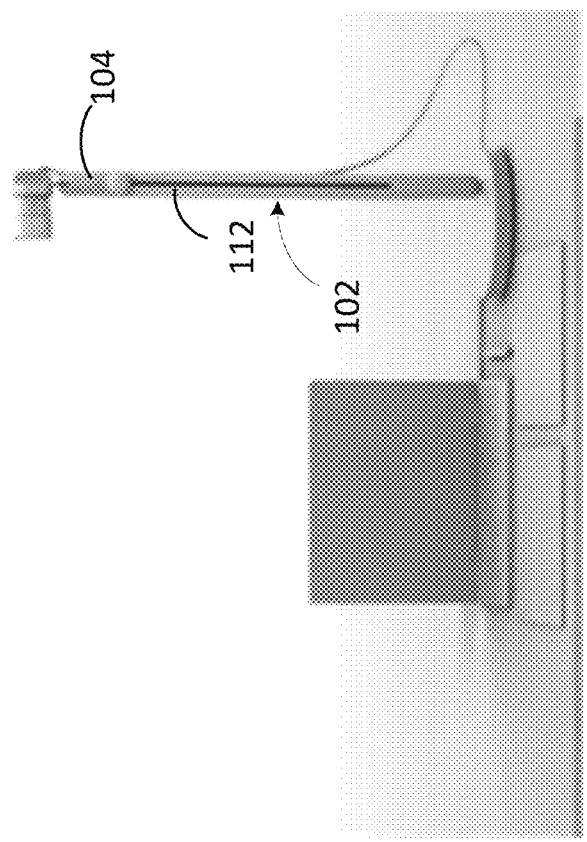
FIG. 1B is a diagram of the adjustable stand of FIG. 1A in a vertical position according to certain embodiments.
Figure 1A:
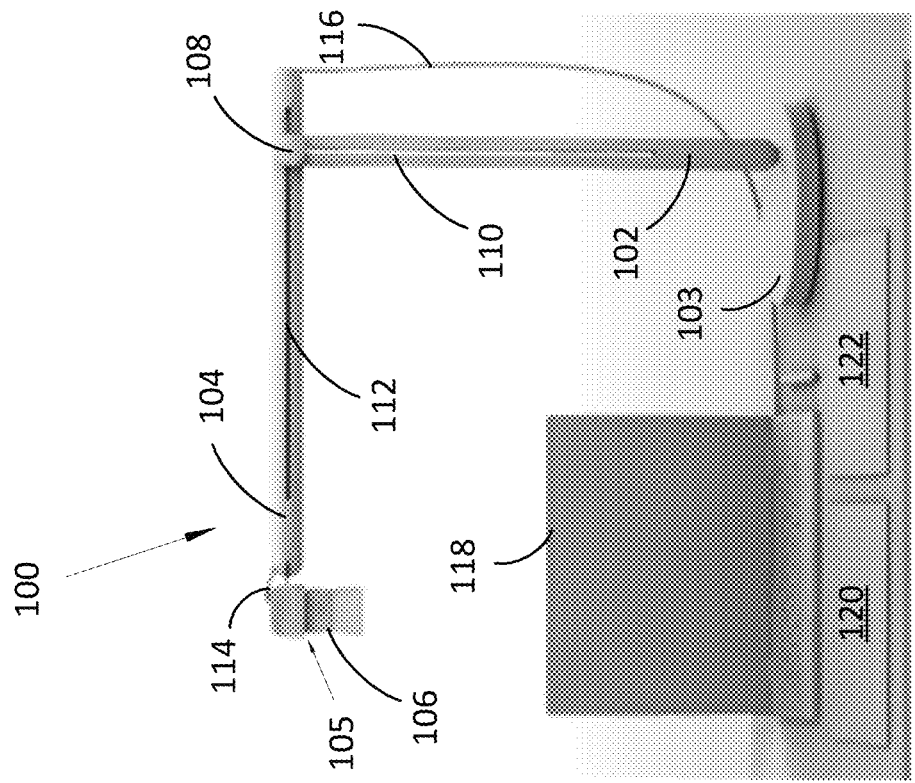
FIG. 1A is a diagram of an adjustable stand in a horizontal position according to certain embodiments.

In one embodiment, an adjustable stand 100, as shown in FIG. 1A, for an electronic device is provided. The adjustable stand has a base 103 with a pole 102 extending vertically from the base. An arm 104 extends from the pole, the arm being extendable horizontally and being vertically rotatable between a horizontal and vertical position. A clamping mechanism adjusts the height of the arm on the pole. An electronic device 106 is attached to the arm, the electronic device being rotatable at least 180 degrees with respect to the arm. In one embodiment, the electronic device is a camera, and is rotatable 360 degrees. A mechanical zoom function that is intuitive to a user is achieve by the user simply grasping the camera and moving it vertically along the pole.

Embodiments enable a user to move the camera 106 in a horizontal plane to a desired horizontal position, causing arm 104 to rotate to follow the camera position. The arm also extends and retracts with respect to supporting pole 102 of the adjustable stand. The user can release a clutch mechanism and move the camera vertically to achieve a desired zoom field of view, causing the arm to move vertically along the pole.

In alternate embodiments, the electronic device can be a camera, light, 3D mouse, microphone, etc.

Other examples, embodiments, modifications, etc., are possible and some are described in further detail below.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1A is a diagram of an adjustable stand 100 in a horizontal position according to certain embodiments. A pole 102 extends vertically from a base 103. The base can include weights to provide stability, such as 800 grams, or between 500 grams and 1 kilogram. An arm 104 extends horizontally from pole 102. An electronic device 106 (e.g., a camera) is suspended from arm 104. A clamping mechanism includes a button 108 that releases a clamp inside pole 102 to allow arm 104 to move vertically in a slot 110 in pole 102. A slot 112 in arm 104 engages an attachment mechanism (not shown) on pole 102. The attachment mechanism allows the arm to be move horizontally by a user pushing or pulling electronic device 106. The attachment mechanism also allows arm 104 to be rotated through a range of angles to a vertical position as shown in FIG. 2.

A cable 114 is connected to electronic device 106 to provide both power and data transfer. The cable runs in a channel in arm 104 and comes out the other end of arm 104 at a cable portion 116, which can be connected to a computer 118. In one embodiment, electronic device 106 is a camera or webcam, and can be rotated at least 180 degrees, or 360 degrees using a ball joint 105, or a donut ring with ball-bearings, or a gooseneck connection, or simply a smooth engagement ring surface to allow rotation. The camera will move counter to the arm, maintaining an image location in the camera's field of view. The camera 106 can be positioned to capture images of papers 120 and 122 on a user's desk.

As can be seen in FIG. 1A, the camera 106 can also be placed in a classic webcam position to show the user. The arm 104 can be lowered to be at the height of the top of computer 118. The arm can be moved side-to-side until it is in a middle position over computer 118. The camera 106 can be rotated so that it is pointed toward the user.

FIG. 1B is a diagram of the adjustable stand of FIG. 1A in a vertical position according to certain embodiments. Arm 104 has been rotated 90 degrees from its position in FIG. 1A to a vertical position, and has been slid down, with button 108 staying stationary while slot 112 moved past it until button 108 is at the other end of slot 112 from the position in FIG. 1A.

Figures 2A, 2B:
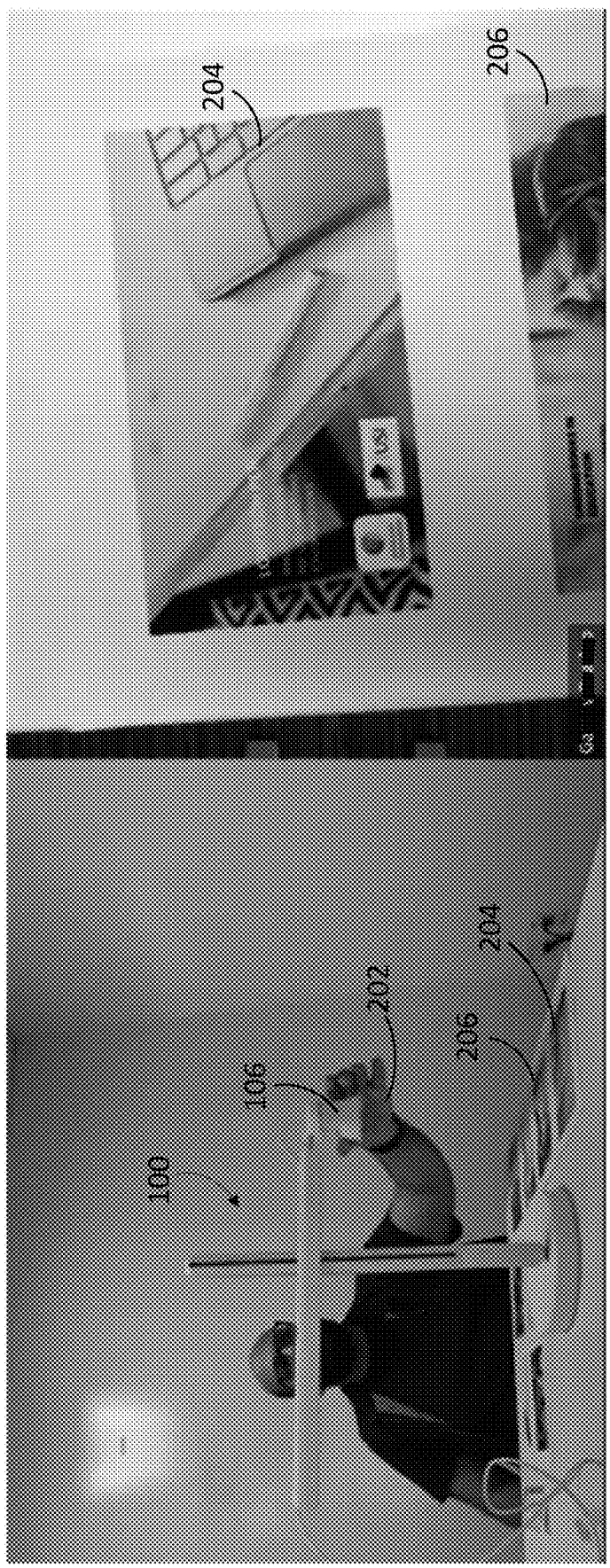
FIG. 2A is a diagram of the adjustable stand of FIG. 1A in a first position and FIG. 2B shows the corresponding view of the camera according to certain embodiments.

FIG. 2A is a diagram of the adjustable stand 100 of FIG. 1A in a first position and FIG. 2B shows the corresponding view of the camera. As shown, the camera 106 is above an image 204, which is shown in the camera view of FIG. 2B. Next to image 204 is a second image 206. A user's hand 202 can grasp camera 106 to move it over image 206, as shown in FIGS. 2C-D.

Figures 2C, 2D:
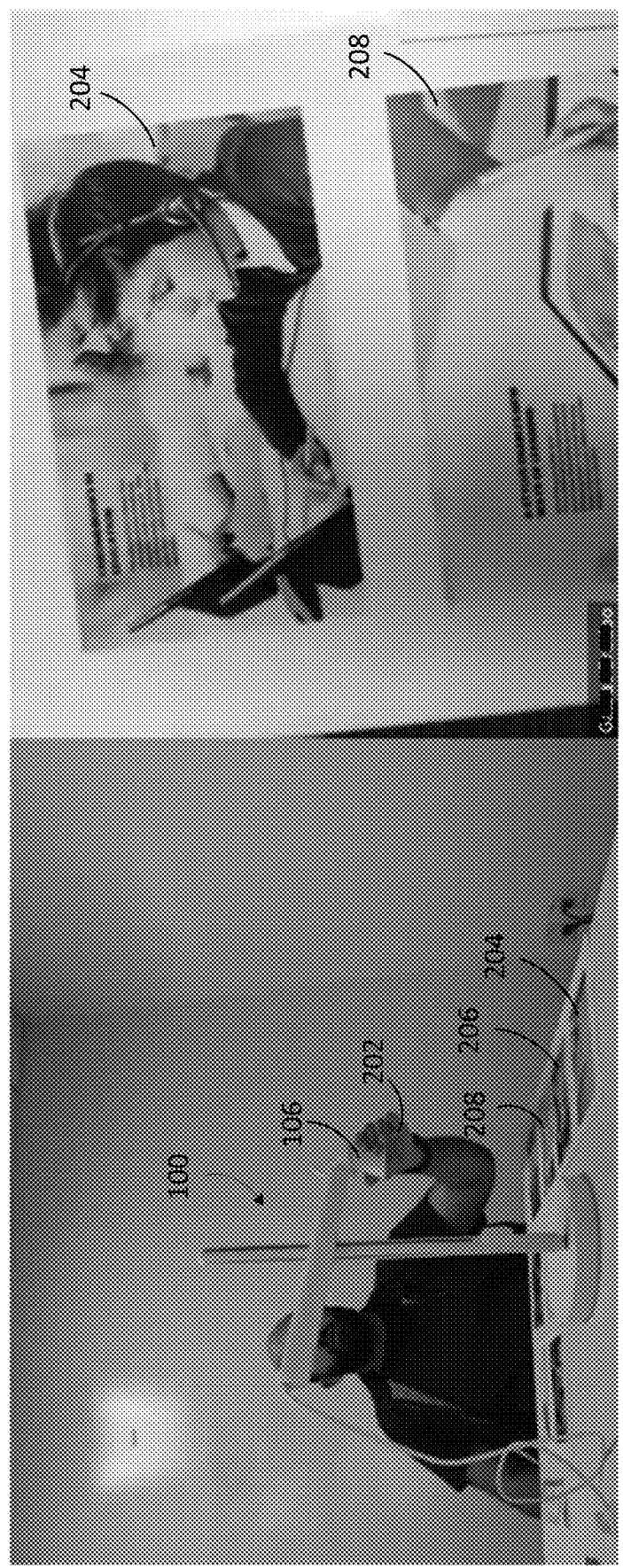
FIG. 2C is a diagram of the adjustable stand of FIG. 2A rotated to bring a different document into view.
FIG. 2D is a diagram showing the corresponding view of the camera according to certain embodiments.

FIG. 2C is a diagram of the adjustable stand 100 of FIG. 2A rotated to bring a different document into view, and FIG. 2D shows the corresponding view of the camera. As can be seen, the user's hand has pulled the camera 106 closer to the user, with the adjustable stand rotating to follow the user's hand. The camera has moved from having document 204 in its view, to having the next document 206 in its view, as can be seen from FIG. 2D. Also, a third document 208 is now partially in view. As can be seen, the orientation of the camera 106 has remained basically the same. In other words, the camera has not rotated with the arm 104 of the stand since the user's hand is holding the camera, causing it to rotate around the ball joint as the arm is rotated.

Thus, the user's natural motion of holding the camera is leveraged by this invention to keep it in the same orientation as the camera stand is rotated. The user's hand and arm act as another arm connected to the camera, fixing it in position and keeping it in generally the same orientation relative to the user. The movement of the camera with the user's hand pulls the arm 104 with it, causing rotation with a movement that is very intuitive to a user. The user simply has to move the camera itself to where the user wants it, and the stand follows. Thus, the user can position the camera where desired using a single hand.

FIG. 3 is a diagram of the adjustable stand 100 of FIG. 1A illustrating horizontal movement according to certain embodiments. As shown, arm 104 has moved relative to the position in FIG. 1A, with camera 106 now closer to vertical pole 102. Arm 104 has moved to the right, so that button 108, which has not moved, is now at the other end of slot 112.

FIG. 4 is a diagram of the adjustable stand 100 of FIG. 1A illustrating vertical movement according to certain embodiments. As can be seen, arm 104 has moved downward so that camera 106 is closer to document 120. Button 108 has moved downward along a slot in vertical pole 102. This provides a manual zoom, with the image of document 120 becoming bigger until if fills the entire camera image and then zooms in on an aspect of document 120. The document stays centered in the field of view of the camera due to the positioning of the arm. Thus, a complex zoom system that requires a user to twist a dial or other mechanism on a camera, at the same time as moving it over the document, is avoided. Rather, the user can operate the zoom intuitively—by moving the camera closer to the document. Arm 104 has also been tilted vertically to the position in FIG. 4, and is no longer strictly horizontal.

Figures 5A, 5B:
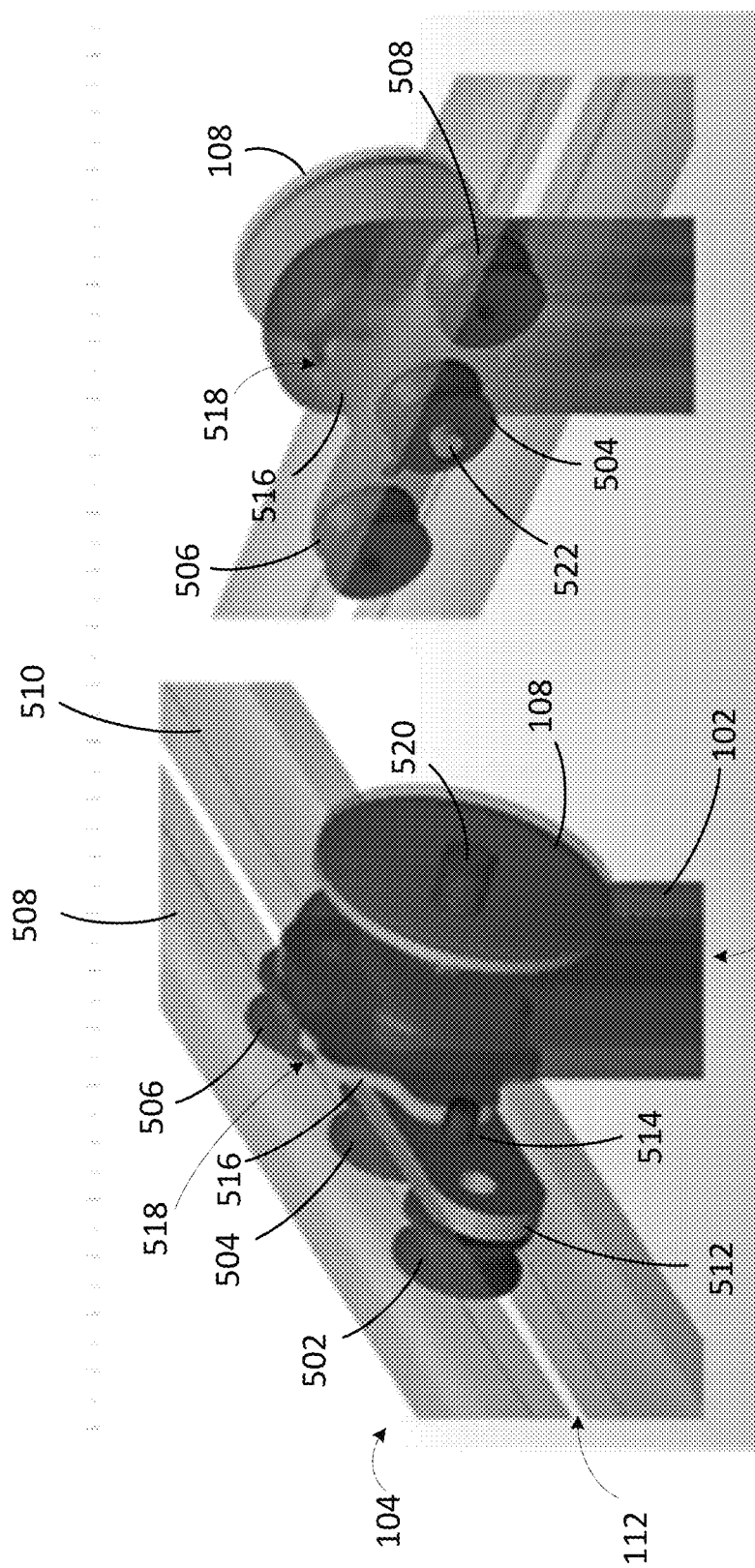
FIGS. 5A-B are diagrams of a roller mechanism for horizontal movement and support of the arm of the stand, according to certain embodiments.

FIGS. 5A-B are diagrams of a roller mechanism for horizontal movement and support of the arm 104 of the stand 100, according to certain embodiments. Three rollers 502, 504 and 506 are mounted to engage with upper member 508 and lower member 510 of arm 104. The upper and lower members define the slot 112 within which the rollers move. The rollers both support arm 104, and allow horizontal movement of arm 104 as slot 112 moves across the rollers. Three rollers are used to provide stability for arm 104, and prevent rocking side-to-side and back-and-forth. Alternately, bearings could be used instead of rollers, or any other mechanism that stably supports the arm and allows horizontal movement and vertical rotation.

The rollers are mounted on an arm plate 512, which is supported by an axle 520 attached to button 108. Arm 104 can move horizontally along the rollers, and also rotate vertically around axle 520. As it rotates, a positioning member (peg) 514 on arm plate 512 can engage one of 4 detents 518 in a clutch plate 516, to fix it in the most desired positions—exactly horizontal or vertical. In one embodiment, clutch plate 516 is two plates with a metal spring in-between. Alternately, a different number of detents, or no detents, could be used. Detents could be provided every 15, 30 or 45 degrees, for example.

FIG. 5B is a back-side diagram of the arm support structure of FIG. 5A. An axle 522 can be seen supporting roller 504. Axle 522 is connected to axle 520 shown in FIG. 5A. Button 108 can be pushed inward against a spring mechanism to allow the arm 104 to move vertically in slot 102. This is described in more detail below.

FIGS. 6A-C are diagrams illustrating horizontal and vertical movement of a stand, according to certain embodiments. FIG. 6A shows the stand in a compact position, with arm 104 rotated vertically and moved down to be essentially co-extensive with pole 102. Button 108, which fixes arm 104 to pole 102, is near the bottom, as is the camera 106 at the end of arm 104. In one embodiment, the camera can have a rechargeable battery that can be inductively charged from a charger in the base of the stand when the camera is in the position shown in FIG. 6A.

FIG. 6B shows arm 104 moved upward, which is done by pressing button 108 to release a clamping mechanism inside, then sliding arm 104 up slot 110 in pole 102. The arm 104 is then rotated to a horizontal position, where a detent is engaged and the button is released to clamp arm 104 at that height. The arm has been slid to the left, so that button 108 is in the middle, moving the arm from its position in FIG. 6A where the button was at the end of arm 104 near camera 106.

FIG. 6C shows arm 104 rotated to the vertical position shown from the horizontal position shown in FIG. 6B. Arm 104 can move upward in two ways. Button 108 can be depressed to release the clamp, and the button can move the arm upward. Also, with the button holding the arm to a fixed height on pole 102, arm 104 can be moved upward along its rollers until button 108 is at the low end of slot 112.

Figure 7:
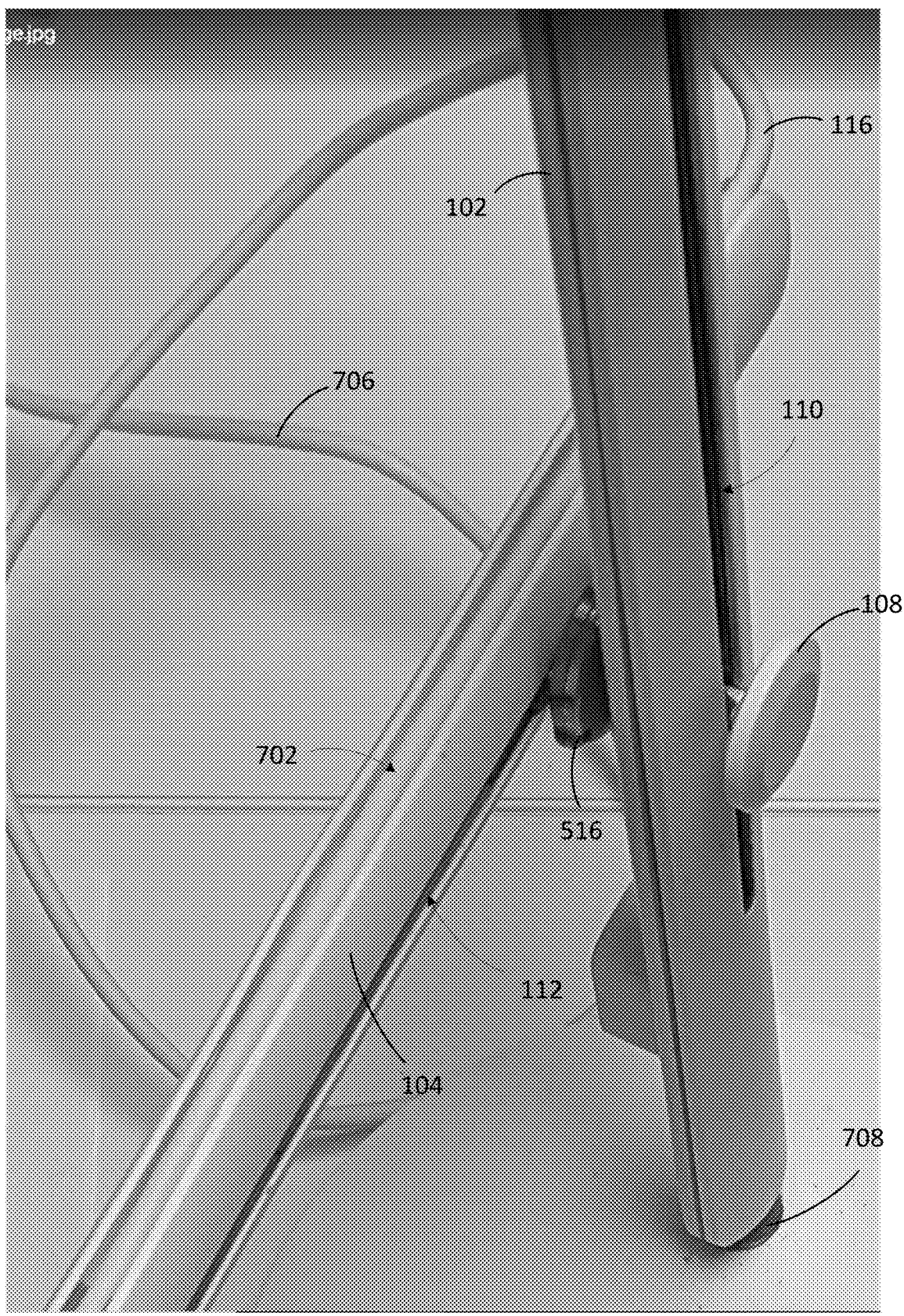
FIG. 7 is a diagram illustrating a pole and arm attachment mechanism, according to certain embodiments.

FIG. 7 is a diagram illustrating a pole and arm attachment mechanism, according to certain embodiments. A channel 702 is shown in the top of arm 104, through which cable 116 can run, so that the cable isn't dangling from the camera. Cable 116 is a DC cable that connects directly to a DC power source, such as a USB port on a computer. In one embodiment, data and power can be provided along the same cable, providing the camera images to the USB or other port of the computer or other computing device. Alternately, the data can be sent wirelessly.

FIG. 7 shows a rotating mechanism 708 that allows pole 102 to rotate 360 degrees with respect to the base. The rotating mechanism can include a ball-bearing ring or rollers or another mechanism. In one embodiment, the camera is powered directly through the arms via contact points in 708 and then a DC-AC connection from the base to a wall outlet, or a USB from the base to computer for power or Power over Ethernet (POE).

Figure 8:
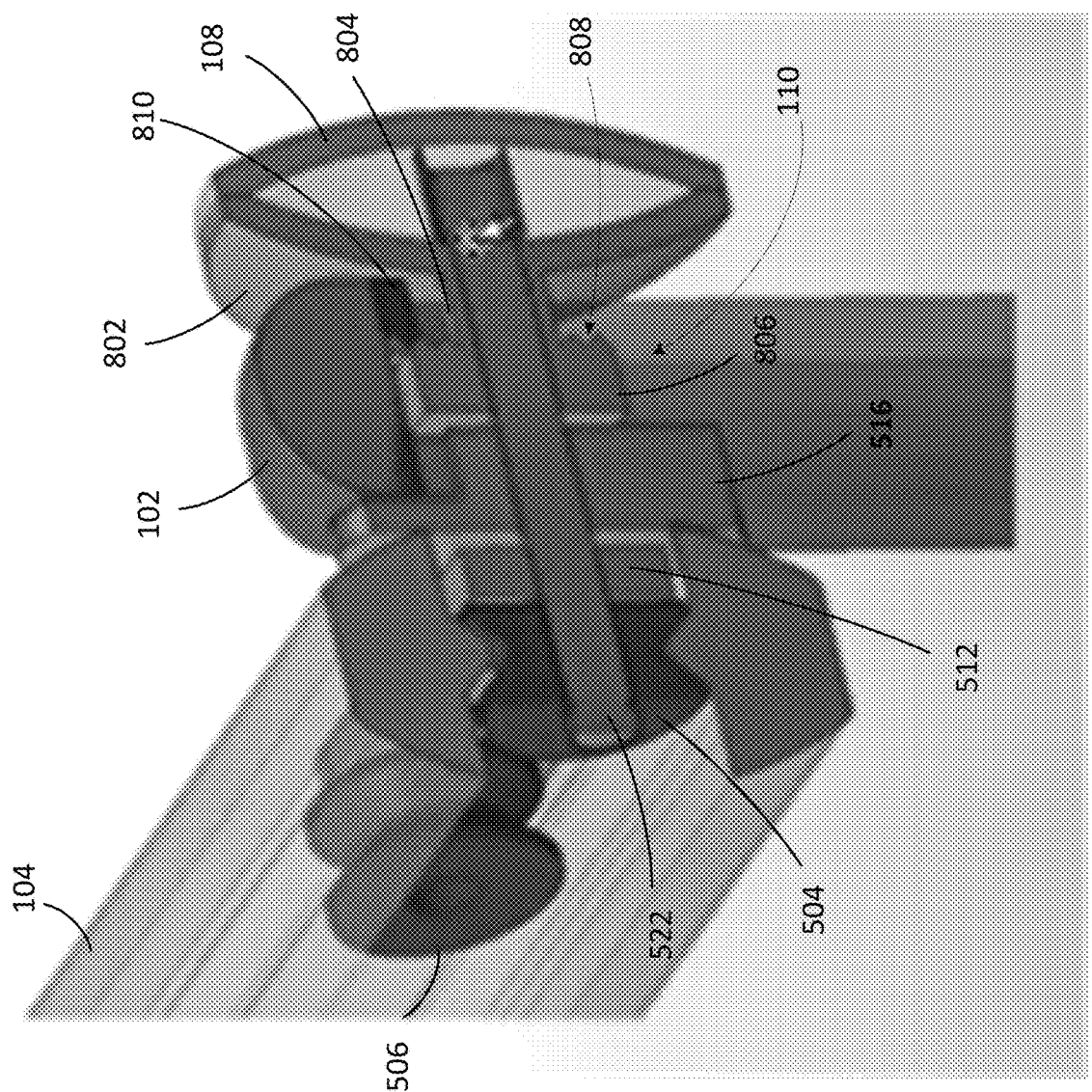
FIG. 8 is a cut-away view of the pole and arm attachment mechanism, according to certain embodiments.

FIG. 8 is a cut-away view of the pole and arm attachment mechanism, according to certain embodiments. As described before, rollers 506 and 504 support arm 104 on an arm plate 512, with middle roller 504 rotating around an axle 522 connected to button 108, which holds the arm at a certain height on pole 102. Rotation positions can engage detents in clutch plate 516. Button 108 has a compressible back portion 802 molded to a support member 804 which supports a block 806. Block 804 has serrated ridges 808 which engage a complementary surface on the inside of slot 110 of pole 102. When button 108 is pushed, portion 802 acts like a spring, and compresses, allowing button 108 to push axle 522, which is connected to block 806 and pushes the serrated ridges 808 away from the complementary ridges of pole 102, thus disengaging. This allows the arm 104 to move up and down along slot 110 as long as button 108 is pressed. When button 108 is released, compressible back portion 802 pushes outward, pulling the serrated ridges 808 back into engagement with the corresponding serrated ridges of pole 102, fixing arm 104 at that height. Alternately, axle 522 may only extend to arm plate 512 and the rollers have a separate shaft to roll on.

FIGS. 9A-B are diagrams of the attachment of the camera to the arm, according to certain embodiments. A rod 902 extends from arm 104 to attach to camera holder 904 and allows rotation around the axis of the rod 902. The camera is also connected to the camera holder 904 by a ball joint, ball-bearing ring or other mechanism, not shown in this view, which allows rotation around an axis perpendicular to rod 902. A connection of the cable 116 to the camera, not shown, has slack to allow the camera (in the holder) to rotate with respect to the arm without causing the cable to disconnect or tear. Cable 116 extends through a hole 906 in cap 904 to connect to camera 106.

FIGS. 10A-B are diagrams illustrating movement of the stand pole with a "Lazy Susan" base, according to certain embodiments. The arm 104 is arranged in a vertical position with respect to pole 102. Base 1002 rotates, in a "Lazy Susan" arrangement, with pole 102 moving around the perimeter of base 1002 from a position 1004 in FIG. 10A to a position 1006 in FIG.

Figure 11:
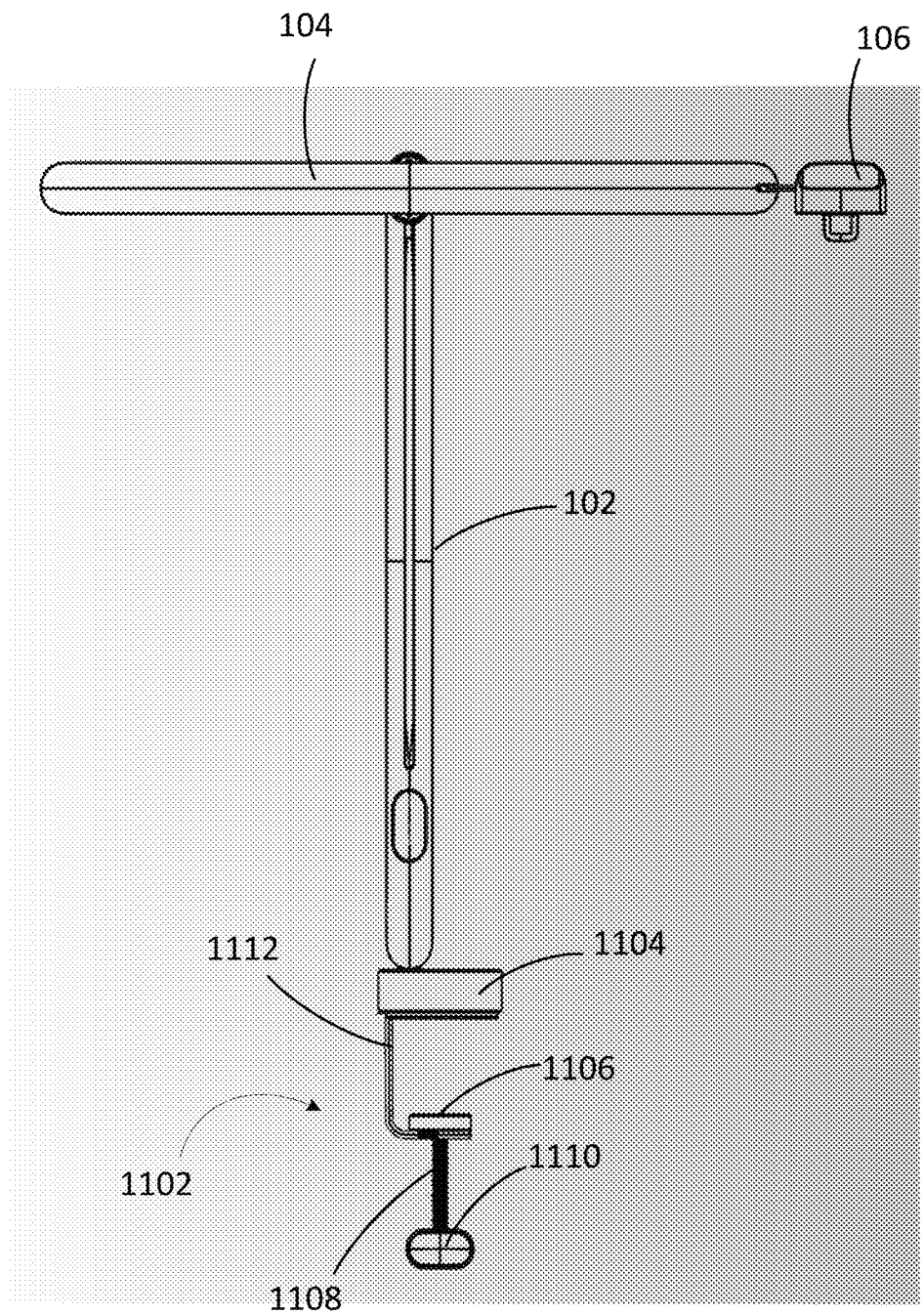
FIG. 11 is a diagram illustrating a clamp support for a stand, according to certain embodiments.

FIG. 11 is a diagram illustrating a clamp support for a stand, according to certain embodiments. A clamp 1102 can hold a base 1104 on the edge of a desk. The clamp has a bottom part 1106 supported by a bracket 1112, that can be screwed upward with a screw 1108 by turning a handle 1106. Base 1104 can be any type of base, and can allow rotation, such as by the Lazy Susan arrangement shown in FIGS. 10A-B.

Figure 12:
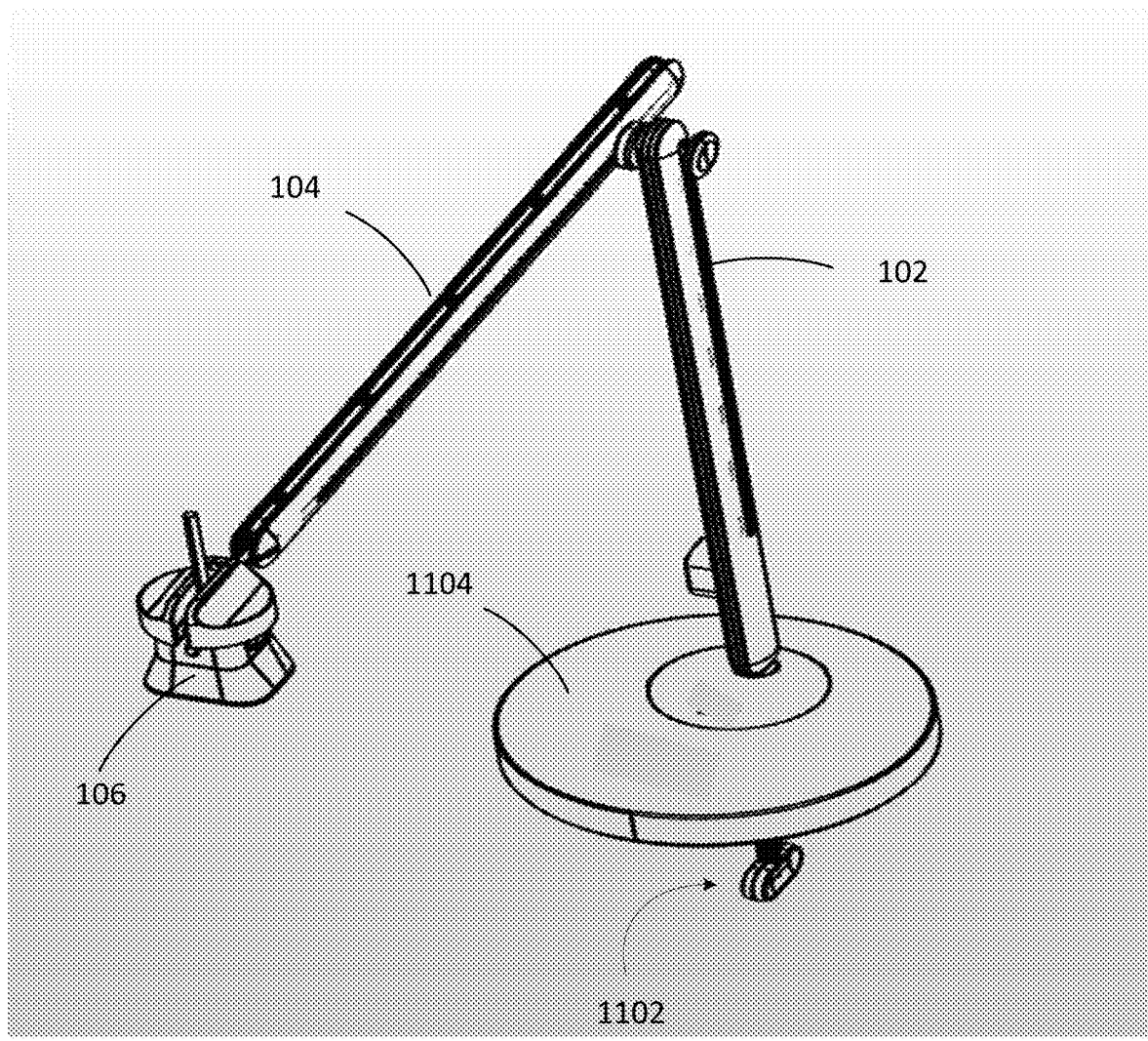
FIG. 12 is a perspective view of a stand with a clamp and a "Lazy Susan" rotating base, according to certain embodiments.

FIG. 12 is a perspective view of a stand with a clamp 1102 and a "Lazy Susan" rotating base 1104, according to certain embodiments.

Figure 13:
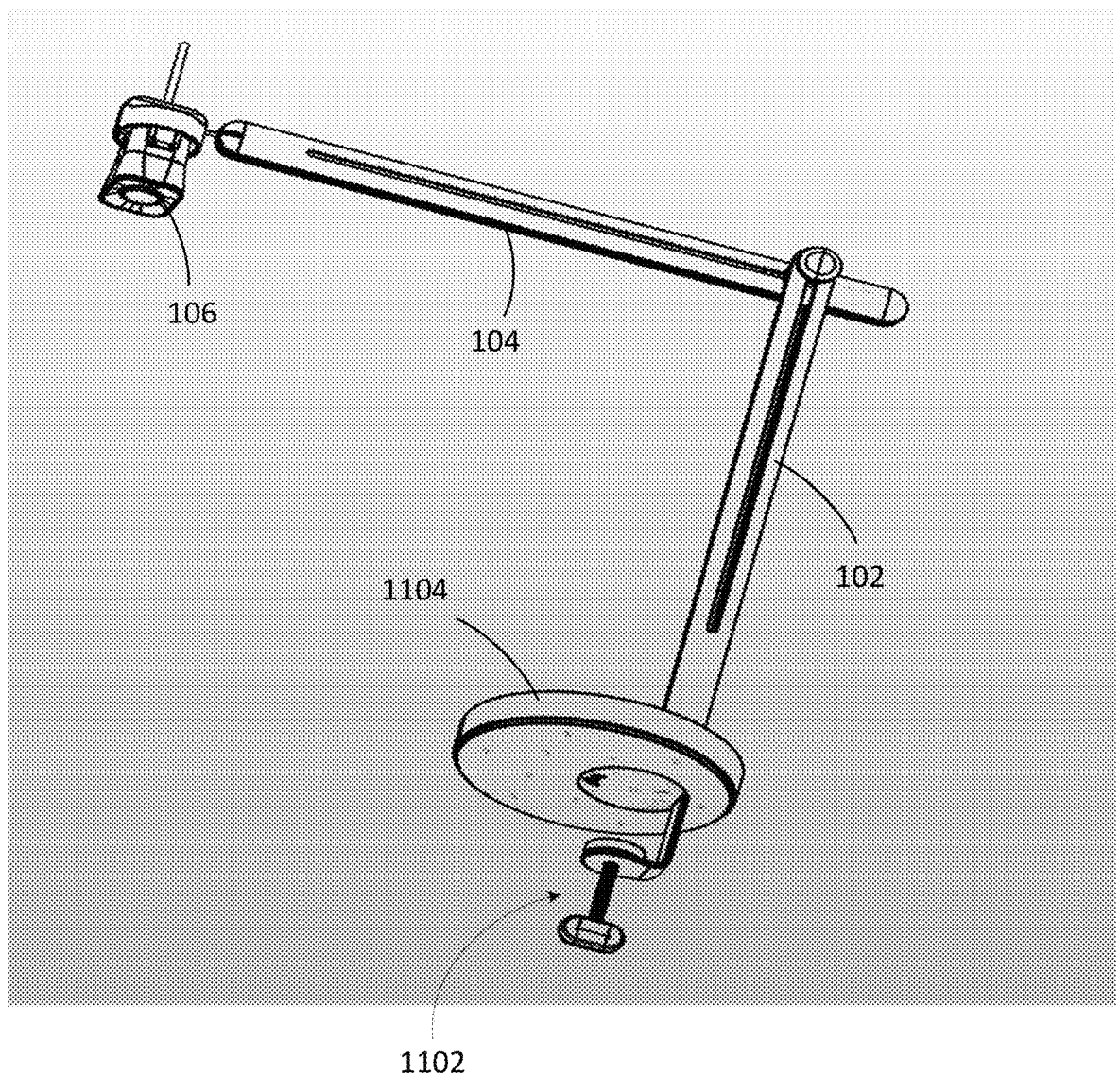
FIG. 13 is a diagram illustrating a pole and arm attachment mechanism, according to certain embodiments.

FIG. 13 is a diagram illustrating the clamp and Lazy Susan arrangement of FIG. 12 from below, according to certain embodiments.

Figure 14:
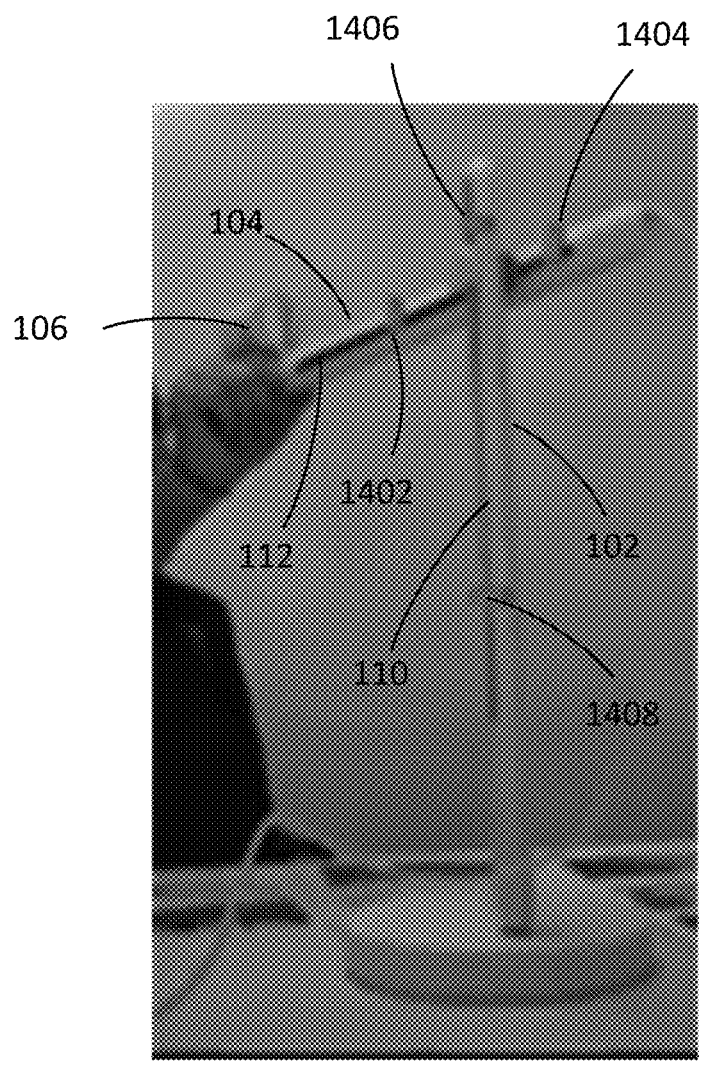
FIG. 14 is a diagram illustrating a stand with adjustable pole and arm clamps limiting horizontal and vertical movement, according to certain embodiments.

FIG. 14 is a diagram illustrating a stand with adjustable pole and arm clamps limiting horizontal and vertical movement, according to certain embodiments. Arm clamps 1402 and 1404 slide within slot 112 of arm 104 to desired limit positions set by a user. Similarly, pole clamps 1406 and 1408 slide within slot 110 of pole 102 to desired positions to limit vertical travel. The arm and pole clamps can have a similar mechanism to button 108, described earlier. A user may want to limit travel to keep the camera over a designated document area on a desk, or to keep the arm from hitting a nearby wall, or for any other reason. In an alternate embodiment, instead of clamps, detents can be used at the clamp positions, and at additional positions. The detents urge the arm into that position, but allow the arm to be pushed beyond the detent, or pulled away from it. The detents provide tactile feedback to the user on a maximum advisable position or optimum positions for different uses.

Figure 15:
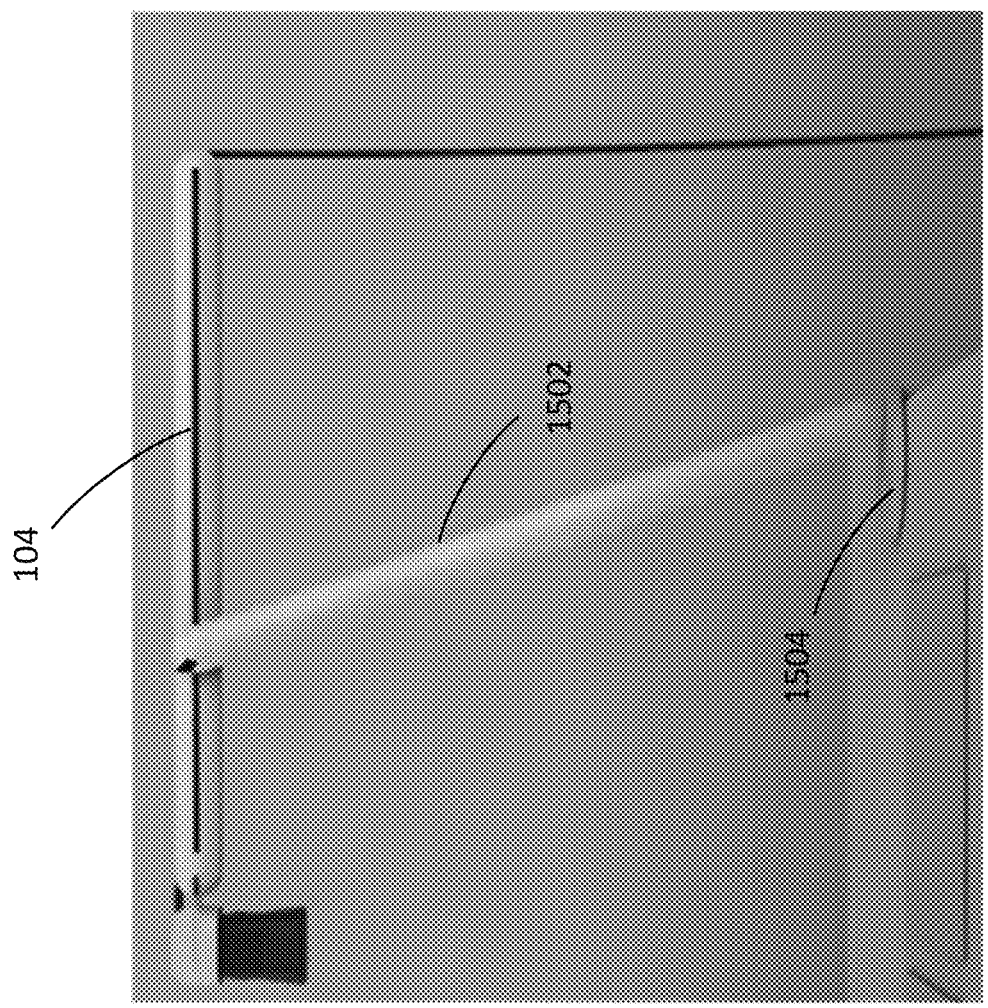
FIG. 15 is a diagram of a stand with an angled pole, according to certain embodiments.

FIG. 15 is a diagram of a stand with an angled pole 1502, according to certain embodiments. Pole 1502 can tilt upward or downward, providing the height adjustment in this manner. The pole 1502 could still rotate, either around where it is connected to base 1504, or in a Lazy Susan or other arrangement.

Figure 16:
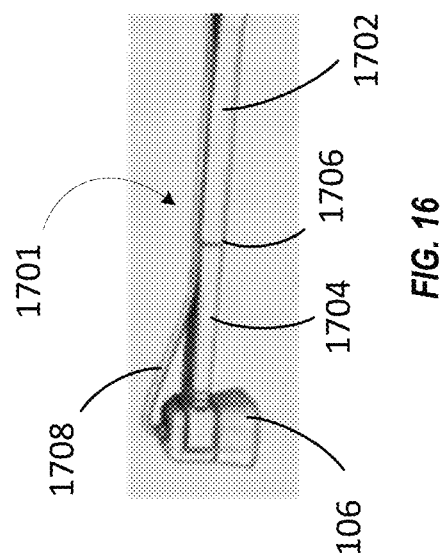
FIG. 16 is a diagram illustrating a telescoping arm for a stand, according to certain embodiments.

FIG. 16 is a diagram illustrating a telescoping arm for a stand, according to certain embodiments. Camera 106 is held by arm 1701, which has a first arm 1702 with a second arm 1704 which telescopes in and out of first arm 1702 at an opening 1706. Cable 1708 has sufficient slack to be able to extend to the camera 106 when second arm 1704 is in the fully extended position. In alternate embodiments, a third telescoping arm could be added. Additionally, or instead, the pole could be telescoping. The telescoping arm can be added to the tilted pole of FIG. 15, or to any of the other embodiments herein.

Figure 17:
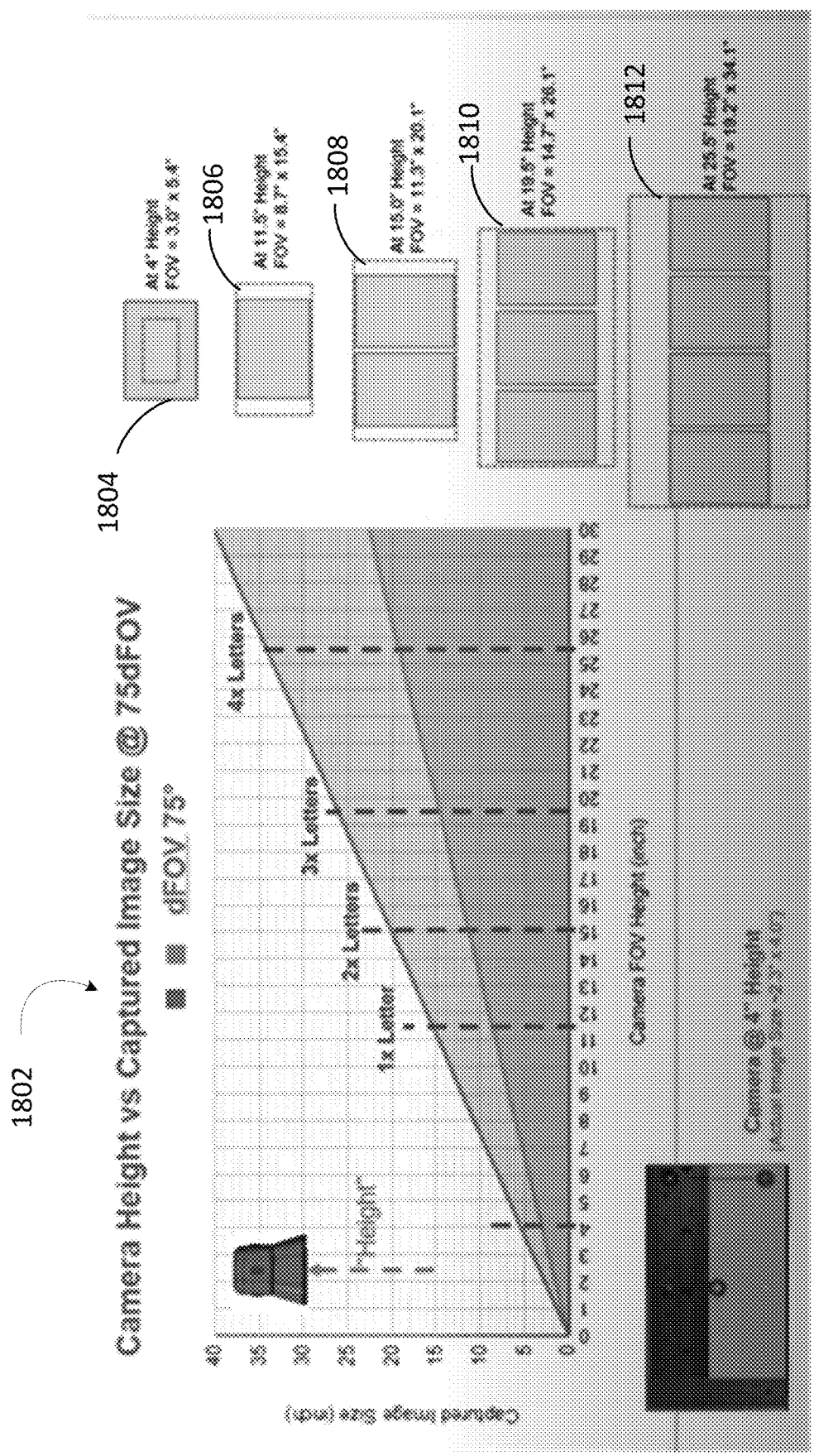
FIG. 17 is a graphical illustration of the vertical zoom movement of a stand, according to certain embodiments.

FIG. 17 is a graphical illustration of the vertical zoom movement of a stand, according to certain embodiments. A graph 1802 shows that as the height of the camera is raised, the field of view (FOV) of the camera increases. Conversely, as the camera is lowered, the FOV decreases, giving a close-up view. This, raising and lowering the camera gives a zoom feature that is intuitive and easy for a user. The images on the right illustrate the FOV of the camera at different heights in one embodiment. Image 1804, at a height of 4 inches, provides a FOV sufficient for a business card. Image 1806, at a height of 11.5 inches, provides a FOV sufficient for a standard 8½×11 inch letter paper, with a FOV of 8.7×15.4 inches. An image 1808 at a height of 13 inches provides a FOV sufficient for 2 letter documents, with a FOV of 11.3×20.1 inches. An image 1810 at a height of 19.5 inches provides a FOV sufficient for 3 letter documents, with a FOV of 14.7×26.1 inches. An image 1812 at a height of 25.5 inches provides a FOV sufficient for 4 letter documents, with a FOV of 19.2×34.1 inches.

Alternate Clamp Embodiments

Figure 18:
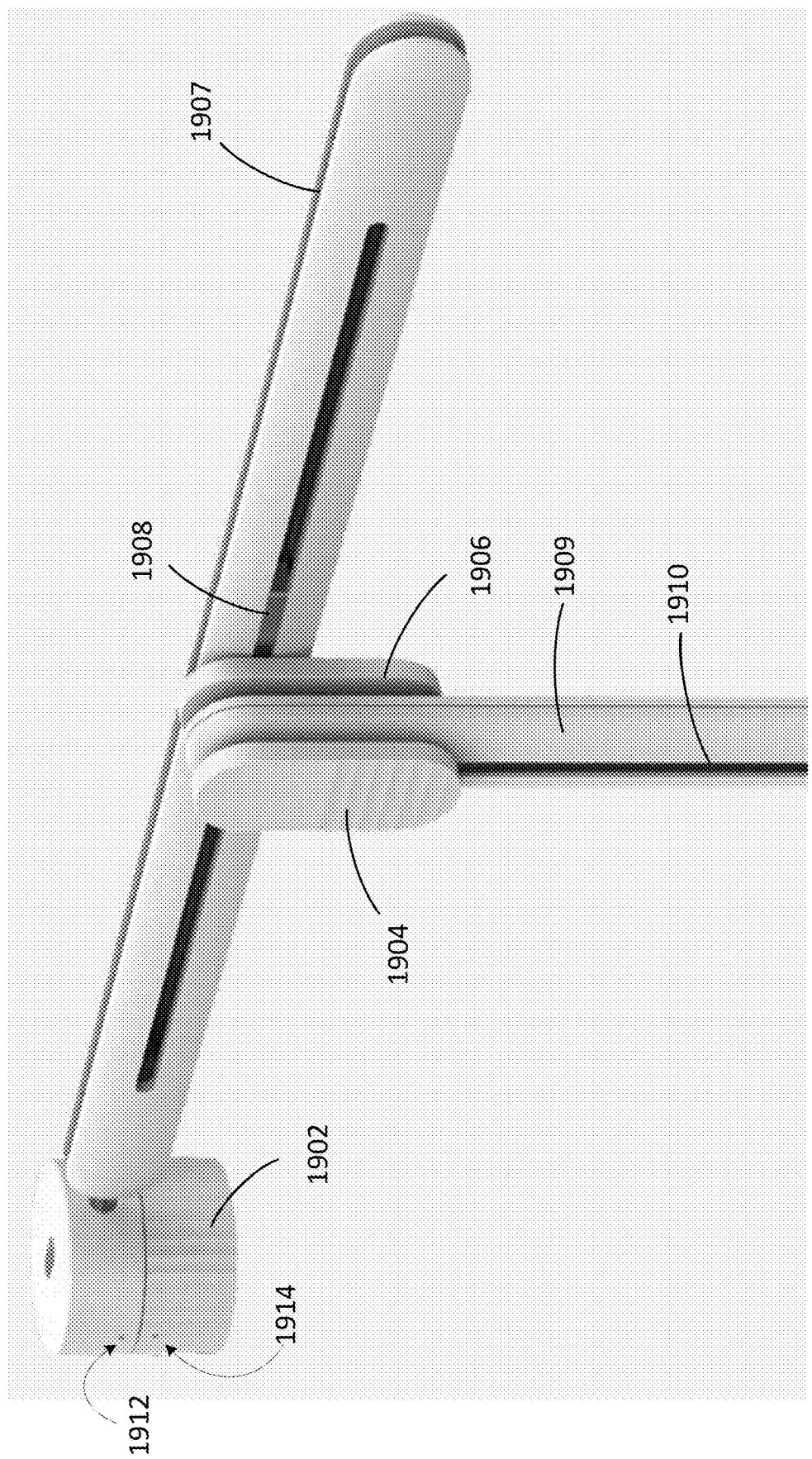
FIG. 18 is a diagram of a camera grab ring and a pole slide mechanism, according to certain embodiments.

FIG. 18 is a diagram of a camera grab ring and a pole slide mechanism, according to certain embodiments. A grab ring 1902 has outer serrations to provide a friction surface for the user to grasp. Indicators 1912 and 1914 show an initial camera position. As grab ring 1902 is rotated, indicator 1914 on the grab ring will move with respect to indicator 1912, giving visual feedback to the user of the amount of rotation. This also allows the user to return the camera to the original position by aligning the indicators again.

Two slide tabs 1904 and 1906 are shown as part of a pole slide mechanism. Tab 1906 is connected to a block 1908 in the arm 1907 to hold the arm. When tabs 1904 and 1906 are pinched together, the arm can slide up and down the pole 1909 along slot 1910.

FIGS. 19-20 are diagrams of an arm slide mechanism, according to certain embodiments. FIG. 19 shows arm slide lever 2002 in one embodiment, to the right of pole 2006 along arm 2004. FIG. 20B shows the arm lever in an alternative embodiment to the left of the pole 2006. The user can hold the arm 2004 and pinch the lever 2002 into the arm 2004 releasing a mechanism that allows the used to move the arm 2004 along pole 2006. When the lever 2002 is released, the mechanism is engaged keeping the arm 2004 at the height along the pole where it was left.

Figure 21:
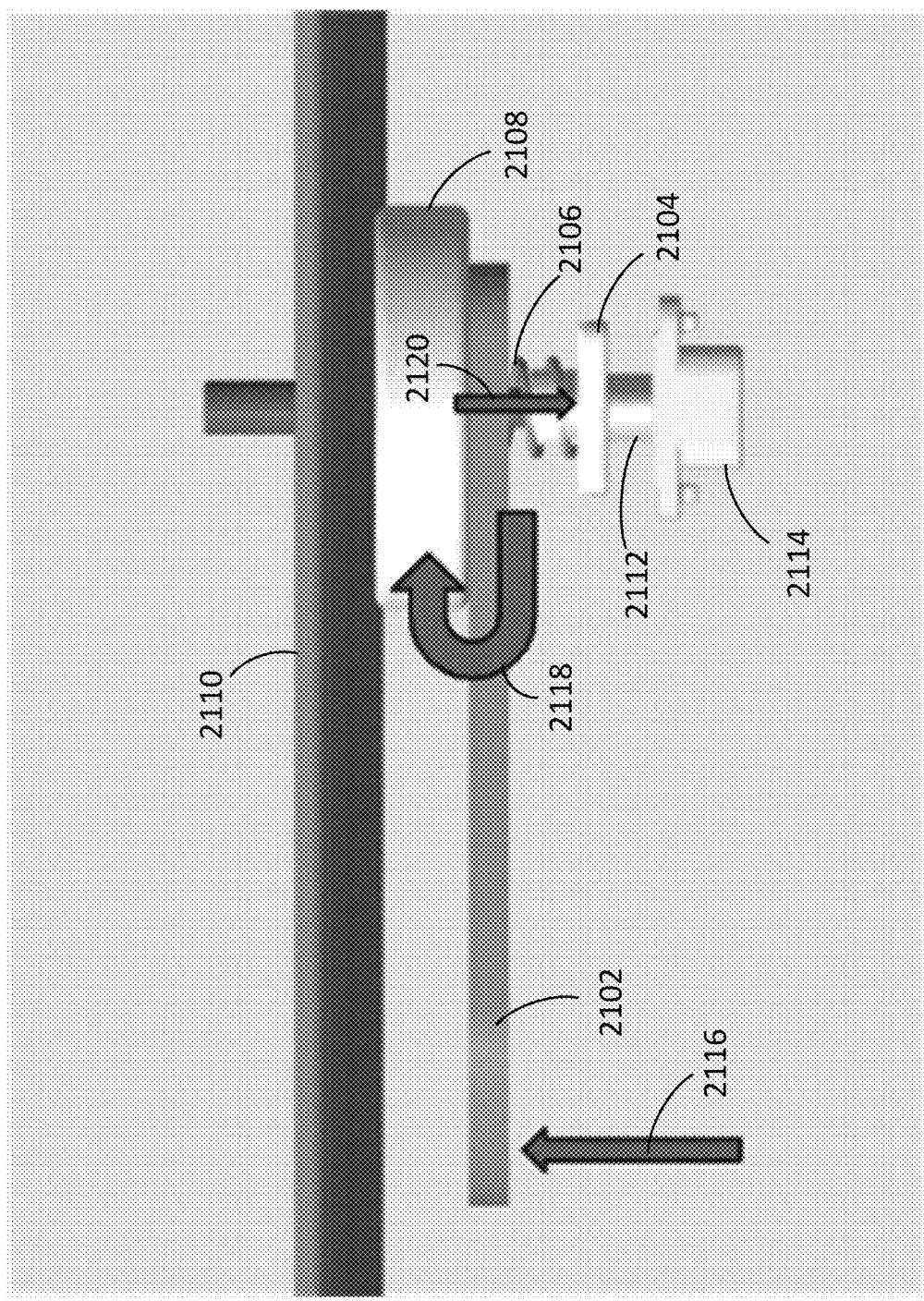
FIG. 21 is a diagram of the details of the slide mechanisms of FIGS. 19 and 20, according to certain embodiments.

FIG. 21 is a diagram of the details of the slide mechanisms of FIGS. 19 and 20, according to certain embodiments. A tab 2102 is biased by a plate 2104 and spring 2106 to pressure a block 2108 against and arm or pole 2110. These elements are mounted on a rod 2112 which is anchored in a block 2114. When a user pinches tab 2102, as indicated by arrow 2116, tab 2102 rotates about the edge of block 2108 as indicated by arrow 2118, causing an end of tab 2102 to move downward as indicated by arrow 2120, compressing spring 2106. This lessens the pressure on arm or pole 2110, allowing movement vertically along rod 2112.

In one embodiment, a switch is provided on the camera to rotate between portrait and landscape FOV. In another embodiment, the camera has a light (e.g, a ring light) for illuminating not only a user's face, but also documents. In other embodiments, haptic or vibration feedback is provided for when document is optimally in field of view. Software code in a camera application on the computer determines when the document is within the field of view, by detecting the document separately from the desktop, as is done for scanning applications. In an alternate embodiment, the camera can slide along the arm, instead of the arm sliding with respect to the pole.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

What is claimed is:

1. An adjustable stand, comprising:
a base:
a pole extending from the base;
an arm extending from the pole, the arm being extendable rotatable;
a clamp for adjusting a position of the arm on the pole;
an electronic device attached to the arm, the electronic device being able to move to different 3-dimensional position in an area through a movement of the pole and the arm;
an arm slot in the arm;
at least three rollers mounted in the arm slot, allowing movement of the arm across the rollers;
an arm plate supporting the rollers on axles allowing rotation of the rollers;
a support member connected to and supporting the plate, the support member being coupled to the pole.

2. The adjustable stand of claim 1 wherein the electronic device is a camera.

3. The adjustable stand of claim 2 further comprising a grab ring connected to the camera, wherein movement of the grab ring by a user causes the camera to move and the arm to follow and move and rotate with respect to the camera.

4. The adjustable stand of claim 1 further comprising:
a pole slot in the pole;
the clamp extending through the arm slot and the pole slot, allowing movement of the arm horizontally and fixing a position but allowing movement of the arm with respect to the pole when the clamp is released.

5. The adjustable stand of claim 4 further comprising a button attached to the clamp, the button depressing when pushed to release a clamping force on the pole.

6. The adjustable stand of claim 1 further comprising:
a base rotating mechanism configured to allow rotation of the pole with respect to the base.

7. The adjustable stand of claim 1 further comprising:
a transmission line providing power to the electronic device;
a channel in the arm guiding the transmission line; and
a connection of the transmission line to the electronic device configured to rotate to keep the transmission line fixed with respect to the arm while allowing the electronic device to rotate with respect to the arm.

8. The adjustable stand of claim 1, further comprising:
a clutch plate mounted between the arm plate and the pole, the clutch plate facilitating rotation of the arm with respect to the pole.

9. The adjustable stand of claim 8 further comprising:
a positioning member extending from the arm plate; and
detents on the clutch plate positioned to engage the positioning member, the detents being at least at positions 90 degrees apart on the clutch plate.

10. An adjustable stand, comprising:
a base:
a pole extending from the base;
an arm extending from the pole, the arm being extendable and rotatable;
a camera attached to the arm, the camera being rotatable with respect to the arm;
a pole slot in the pole;
an arm slot in the arm;
a clamp extending through the arm slot and the pole slot, allowing movement of the arm and fixing a position but allowing movement of the arm with respect to the pole when the clamp is released;
a button attached to the clamp, the button depressing when pushed to release a clamping force on the pole;
wherein movement of the camera by a user causes the arm to follow and move and rotate with respect to the camera;
at least three rollers mounted in the arm slot, allowing movement of the arm across the rollers;
an arm plate supporting the rollers on axles allowing rotation of the rollers; and
a support member connected to and supporting the plate, the support member being coupled to the pole.

11. The adjustable stand of claim 10 further comprising
a base rotating mechanism allowing rotation of the pole with respect to the base.

12. The adjustable stand of claim 10 further comprising:
a transmission line providing power to the camera;
a channel in the arm guiding the transmission line; and
a connection of the transmission line to the camera which rotates to keep the transmission line fixed with respect to the arm while allowing the camera to rotate with respect to the arm.

13. The adjustable stand of claim 10 further comprising:
a clutch plate mounted between the arm plate and the pole, the clutch plate facilitating rotation of the arm with respect to the pole.

14. The adjustable stand of claim 13 further comprising:
a positioning member extending from the plate; and
detents on the clutch plate positioned to engage the positioning member, the detents being at least at positions 90 degrees apart on the clutch plate.

15. The adjustable stand of claim 14 further comprising:
a compressible element connected to the button;
a support member connecting the button to the arm plate;
a block connected to the member, the block having serrated ridges;
a serrated surface on an inside of the pole slot configured to engage the serrated ridges of the block; and
whereby when the button is pushed, the serrated ridges are separated from the serrated surface, thus disengaging and allowing movement of the arm plate and the arm.

* * * * *